United States Patent
Raphael et al.

(10) Patent No.: US 10,897,367 B1
(45) Date of Patent: Jan. 19, 2021

(54) DATA PROTECTION POLICY ENFORCEMENT DECISION MAKING IN COLLABORATIVE FRAMEWORK ENVIRONMENTS

(71) Applicant: INTERNATIONAL BUSINESS MACHINES CORPORATION, Armonk, NY (US)

(72) Inventors: Roger C. Raphael, San Jose, CA (US); Rajesh M. Desai, San Jose, CA (US); Olena Woolf, Toronto (CA); Arron La, Fountain Valley, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/523,378

(22) Filed: Jul. 26, 2019

(51) Int. Cl.
*H04L 29/08* (2006.01)
*H04L 12/18* (2006.01)

(52) U.S. Cl.
CPC .............. *H04L 12/18* (2013.01); *H04L 67/10* (2013.01)

(58) Field of Classification Search
CPC ................................ H04L 12/18; H04L 67/10
See application file for complete search history.

(56) References Cited

U.S. PATENT DOCUMENTS 8,874,929 B2 * 10/2014 Fastring ................ H04L 9/0825
713/189

OTHER PUBLICATIONS

Booch et al., "Collaborative Development Environments", Rational Software Corporation, Oct. 28, 2002, 27 pages.
Giffin et al., "Hails: Protecting Data Privacy in Untrusted Web Applications", USENIX Association, 2012, 14 pages.
O'Murchu, "Assessing the Provision of Prevention in the Care Pathway for Children Undergoing Dental Extractions under General Anaesthetic at the Royal Hospital for Children, Glasgow: A Qualitative Systems-Level Needs Assessment.", University of Glasgow, May 2017, 235 pages.
Paspalakis, "The impact of digital technology on consumer behaviour and business operations—Case Study", University of Piraeus, Nov. 2018, 131 pages.

(Continued)

*Primary Examiner* — Adnan M Mirza
(74) *Attorney, Agent, or Firm* — Scott Dobson; Andrew D. Wright; Roberts Calderon Safran & Cole, P.C.

(57) ABSTRACT

A data protection policy enforcement operation is provided for enforcing data protection policies in collaborative framework environments which permit a plurality of collaborators to jointly work on projects requiring access to project data assets. For this purpose, a method includes establishing, by a computer device, a plurality of rules for evaluating actions performed in a collaborative environment, the collaborative environment including a plurality of collaborators and a plurality of data assets associated with collaboration between the collaborators; in response to a request to perform an action in the collaborative environment, applying the rules to the plurality of data assets related to the data assets to create a plurality of determinations; in response to each of the plurality of determinations being allowed, allowing the action to be performed; and, in response to at least one of the plurality of determinations being denied, preventing the action from being performed.

20 Claims, 7 Drawing Sheets

(56) References Cited

OTHER PUBLICATIONS

Evans, "Open Exeter Project Plan", JISC Project Plan, Oct. 11, 2011, 24 pages.
Rakotoarivelo et al., "OMF: A Control and Management Framework for Networking Testbeds", ACM SIGOPS Operating Systems Review, vol. 43, Issue 4, Jan. 2010, 6 pages.
Riga et al., "The Experimenter's View of GENI", Springer International Publishing Switzerland, 2016, DOI 10.1007/978-3-319-33769-2_15, 31 pages.

* cited by examiner

DATA PROTECTION POLICY ENFORCEMENT DECISION MAKING IN COLLABORATIVE FRAMEWORK ENVIRONMENTS

BACKGROUND

The present invention generally relates to collaborative framework environments, and, more particularly, to enforcing data protection policies in collaborative framework environments which permit a plurality of collaborators to jointly work on projects requiring access to project data assets within a collaborative framework environment.

A collaborative framework can be defined as a logical construct to allow multiple data users, also known as collaborators, each with their own identity, to collectively work on artifacts of data. In such a construct, the users are jointly permitted to work on the data within the environment with some established data protection rules that treat the collaborators and the associated data as a single entity which is technically managed as a single data security domain of its own. This construct in some embodiments is referred to as a Project or a Sandbox, and is the typical approach to analytics and model development in the data science community.

Enforcement of data protection policies, comprised of data protection rules, in such a construct stems from a cumulative disposition of the data that exists or is assigned to a project as well as the cumulative risk factors, with their users (e.g., collaborators), their intent and other risk factors, as well as the cumulative nature of all the data within that project or the data intended to be moved to the project. The data movement can be logical or physical. This paradigm results in a two-dimensional analysis necessary for any action on the boundary or periphery of the project or sandbox, for example, moving data in or out of a project, or inviting or dis-inviting new or existing collaborators. Enforcement decisions have to be cumulative in nature over both of these dimensions.

SUMMARY

In a first aspect of the invention, there is a method comprising: establishing, by a computer device, a plurality of rules for evaluating actions performed in a collaboration environment, the collaborative environment including a plurality of collaborators and a plurality of data assets associated with collaboration between the collaborators; in response to a request to perform an action in the collaborative environment, applying, by the computer device, the rules to the plurality of sets of data assets to create a plurality of determinations; in response to each of the plurality of determinations being allowed, allowing, by the computer device, the action to be performed; and in response to at least one of the plurality of determinations being denied, preventing, by the computer device, the action from being performed.

In another aspect of the invention, there is a system comprising: a processor, a computer readable memory, and a computer readable storage medium located in a computer device; program instructions to establish a plurality of rules for evaluating actions performed in a collaborative environment, the collaborative environment including a plurality of collaborators and a plurality of data assets associated with collaboration between the collaborators; program instructions to, in response to a request to perform an action in the collaborative environment, apply the rules to the plurality of sets of data assets to create a plurality of determinations; program instructions to, in response to each of the plurality of determinations being allowed, allow the action to be performed; program instructions to, in response to determining that one of the data assets is not allowable under the rules, but would be allowable if a portion of the one of the data assets was transformed to a form that is allowable, provide a determination that the portion of the one of the data assets needs to be transformed before the action is allowed; and program instructions to, in response to at least one of the plurality of determinations being denied, prevent the action from being performed, wherein the program instructions are stored on the computer readable storage medium for execution by the processor via the computer readable memory.

In another aspect of the invention, there is computer program product, comprising a computer readable storage medium having program instructions embodied therewith, the program instructions executable by computer device to cause the computer device to: establish a plurality of rules for evaluating actions performed in a collaborative environment, the collaborative environment including a plurality of collaborators and a plurality of data assets associated with collaboration between the collaborators; in response to a request to perform an action in the collaborative environment, apply the rules to the plurality of data assets to create a plurality of determinations; in response to each of the plurality of determinations being allowed, allow the action to be performed; and, in response to at least one of the plurality of determinations being denied, prevent the action from being performed.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
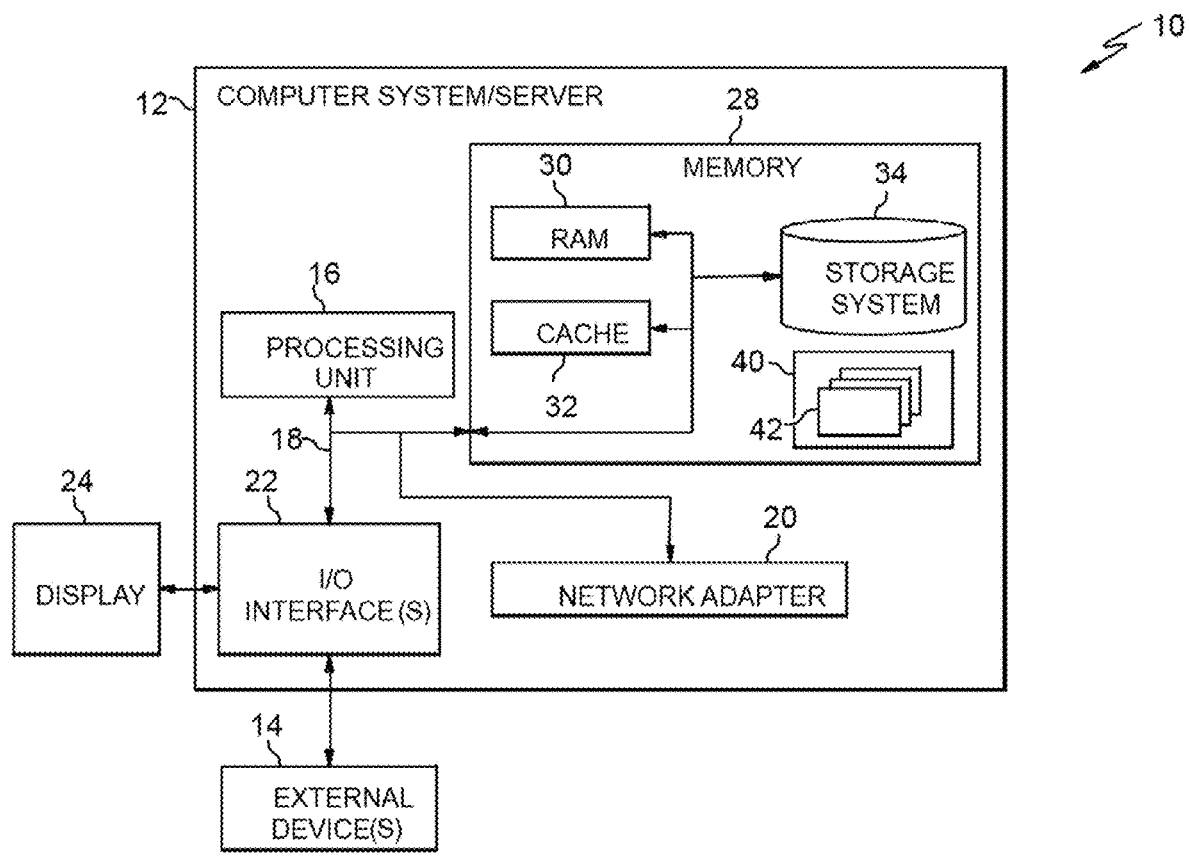
FIG. 1 depicts a computing infrastructure in accordance with aspects of the invention.

The present invention generally relates to collaborative framework environments, and, more particularly, to enforcing data protection policies in collaborative framework environments which permit a plurality of collaborators to jointly work on projects requiring access to project data assets within a collaborative framework environment. In such a construct as a project, the problem of setting the appropriate enforcement presents itself from a number of directions. The goal is to allow the appropriate amount of freedom to collaborators of the project to work on the data within the project without being burdened by overly stringent policies that may individually affect the access of one or more collaborators independently outside the context of the project, that is, a collaboration instance in general. In an ideal situation, the project should be treated as a single proxy identity where security is concerned so long as the system can computationally meet the challenge of ensuring the declared data protection policies for a given organization which will be set by a group leader or administrator, such as a Chief Data Officer (CDO), are not violated in any way. The solution is to be able to find the right point on a Utility-Privacy curve that does not hinder productivity nor compromise data security and privacy within the confines of a project concept. The problem then is whether there can be uniform enforcement policy with data consistency across all peer collaborators at every point in the life cycle of the project. Embodiments of the present invention are directed to providing such uniform enforcement policy with data consistency for all collaborators at every point in the lifecycle of a collaborative project.

For example, in collaborative projects, typically a number of different collaborators are involved in one or more projects that require access to data which is pertinent to the project. This data includes data assets such as documents, tables etc. In order to ensure protection of these data assets, company policies are typically set to control access to the data assets. These company policies are typically controlled by a group leader of the collaborative project, such as an administrator.

Typically, all collaborators in a project are put into a single group which is governed as a single entity. Although this provides for a relatively simple management of the access of the collaborators to the data assets in accordance with company policies, it is essentially a static approach that does not adapt to the dynamics of ever-changing policies based enforcement, and is often either too restrictive or too lax with regard to individuals within the group. In other words, situations frequently exist where some of the collaborators have a higher degree of security clearance than other collaborators, but, in the typical situation in which all collaborators are treated as a group, those collaborators with a higher degree of security clearance are denied access to project data assets which they would otherwise be authorized to access. Similarly, relaxing the data policies to accommodate such collaborators with a higher degree of security clearance can result in overly lax security with regard to other collaborators in the project who have a lower level of security clearance. Embodiments of the present invention are directed to evaluating individual collaborators with regard to their access and operational capabilities within the project in a dynamic manner, particularly with regard to actions taken by users within the collaborative project.

An example of such access, operational capabilities and actions of the users with the collaborative project, is a human resources (HR) table containing information about employees that is used for salary analysis according to zip code. Apart from address and salary, such a table also has social security numbers (SSN) for the context of the project in an unrelated column. In a lax policy case, the CDO potentially needs to give access to the SSN information to all employees, which increases risk for misuse of such sensitive information. In case of a more cautious use case, the CDO restricts access to some or all of the users to the SSN information, thereby protecting the information, but reducing data utility.

Aspects of the present invention include applying multi-dimensional policy evaluation rules to various types of actions initiated by users, who may or may not be current collaborators of the project. Some examples of possible actions to evaluate in accordance with aspects of the present invention are inviting a new user to become a project collaborator, disinviting a current collaborator from the project, cloning/moving data assets from a curated catalog to the project, cloning/moving public datasets to the project, publishing data assets from the project to a curated catalog, removing data assets from a project, and applying the organization policy change to the current project. It is noted that this listing of possible actions is solely for purposes of non-limiting example, and other actions utilized with regard to a collaborative project can also benefit from the features of the invention discussed herein.

Advantageously, embodiments of the present invention provide technical solutions to the problem of providing data protection by applying policy enforcement decision-making in collaborative projects involving a plurality of project collaborators, particularly with regard to applying the policy enforcement decisions on an individual basis, as opposed to treating the plurality of collaborators as a single entity. In implementations, the methods and systems perform unconventional operations of applying policy enforcement rules to protect project data assets utilized in a collaborative project involving a plurality of collaborators, but applying these policy enforcement rules on an individual basis to ensure uniform enforcement with data consistency for all of the individual collaborators, without hindering productivity or compromising data security and privacy within the confines of the project concept. Continuing with the previously mentioned example regarding an HR table, the organization CDO policy can be that if SSN information exists as a data asset, then the SSN information can be transformed before giving wider access to the asset to some or all of the users. The policy will apply to the HR table asset removing the sensitive SSN information from the data while still providing good data utility.

Aspects of the invention are implemented using devices and techniques that are necessarily rooted in computer technology, such as a curated catalog which is a universal collection of project data assets available to an organization for performing a project, project data assets which are objects that contain metadata about the actual project data, rather than comprising the actual data itself, and analysis software for transforming project data assets provided to collaborators of a project when it is determined to be necessary to permit one or more individual project collaborators to access the project data assets based upon the application of the data protection rules.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure 10 is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
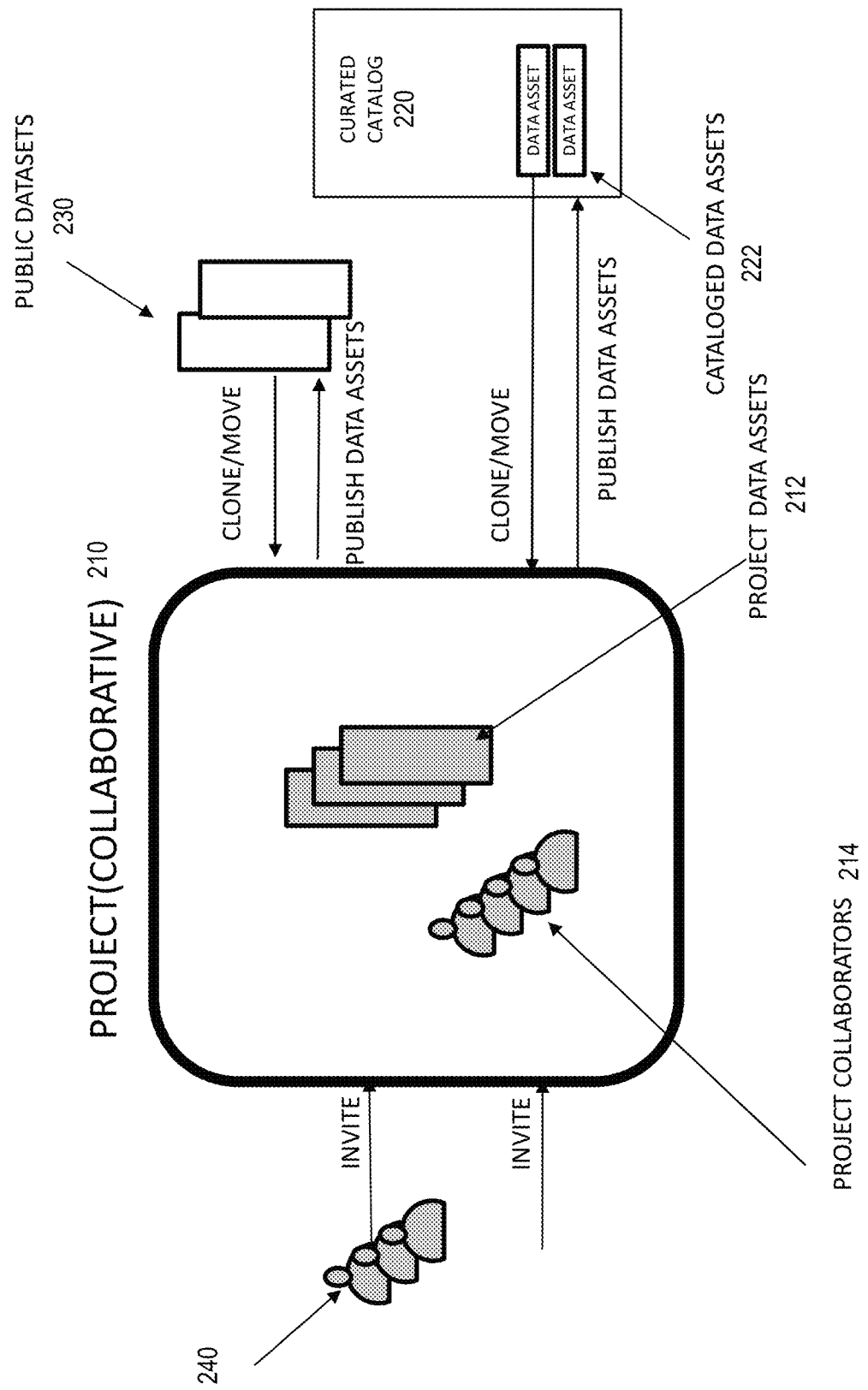
FIG. 2 shows a block diagram of an exemplary embodiment for policy rule enforcement in collaborative frameworks according to aspects of the invention.

FIG. 2 shows a block diagram of an exemplary embodiment in accordance with aspects of the invention. In this embodiment the computer system/server 12 of FIG. 1 provides for storing project data assets 212 for a collaborative project 210 in the memory 28 of the computer system/server 12. The memory 28 also stores information regarding current project collaborators 214 who have been granted access to the project data assets 212. In addition, the processing unit 16 of the computer system/server 12 provides the project collaborators 214 with process capabilities for utilizing the project data assets 212 to work on and develop the collaborative project 210.

As also shown on FIG. 2, the project 210 is designed to allow for inviting new users 240 to request becoming project collaborators 214 utilizing the I/O interface 22 of FIG. 1 in conjunction with an external device 14. The action by a new user 240 with regard to this invitation process is discussed hereinafter with regard to FIG. 5.

As also shown in FIG. 2, another action in accordance with aspects of the present invention is cloning/moving a new data asset, such as cataloged data assets 222, from a curated catalog 220 into the project 210 via the I/O interface 22 of FIG. 1. This action is discussed hereinafter with regard to FIG. 6. In addition, as also shown FIG. 2, the project 210 publishes project data assets 212, when authorized by an administrator, such as Chief Data Officer (CDO) and/or the project collaborators 214, from the project 210 to the curated catalog 220 via an interface 22. Regarding this, it is noted that a CDO for a given organization is generally the person responsible for data protection policies for the organization, which policies apply to all data assets for the organization. The CDO can change data protection policies/rules over time, due to external factors such as change in local laws and/or regulations, or due to internal factors such as discovering security vulnerability.

As also shown in FIG. 2, the project 210 receives project data assets from public datasets 230, and publishes project data assets 212 to the public datasets 230 when authorized by the administrator and/or the project collaborators 214 to do so. Examples of other actions which the project 210 performs include changing data protection enforcement policies for actions such as those discussed above (noting that the action of changing these policies is discussed hereinafter with regard to FIG. 7), disinviting project collaborators 214 under certain circumstances, such as changes in policy dictating that certain project collaborators 214 should no longer be given access to the project data assets 212, and removing project data assets 212 from the project 210, for example, when certain ones of the project data assets 212 are no longer relevant or become outdated.

In accordance with embodiments, the project data assets 212 are objects that contain metadata about the actual data, but which are not actual data themselves. In this embodiment, the actual data is stored elsewhere in the memory 28 of FIG. 1, thereby saving memory space within the project 210 itself. In alternative embodiments, the project data assets 212 are actual complete data, rather than only metadata. Similarly, the cataloged data assets 222 in the curated catalog 220 are, in some embodiments, metadata about the actual data, and, in alternative embodiments, actual data.

The cataloged data assets 222 can be moved/cloned from the curated catalog 220, such as into a project area enforcing the current data protection policies. They can also be exported to the public datasets 230 according to current organization policies. Regarding this, there can be different projects going on with different sets of collaborators. In any case, the access to the cataloged data assets 222 depends on current data protection policies and the collaborators 214 taking part in the project.

In accordance with embodiments, the curated catalog 220 is a universal collection of all possible data available to an organization which is carrying out the project 210. In embodiments, the cataloged data assets 222 of the curated catalog 220 include both secret data, which the organization intends to protect from public disclosure, and non-secret data which does not need to be protected. Data assets stored in the public datasets 230, on the other hand, are, of course, publicly available, and do not need to be protected.

Figure 3:
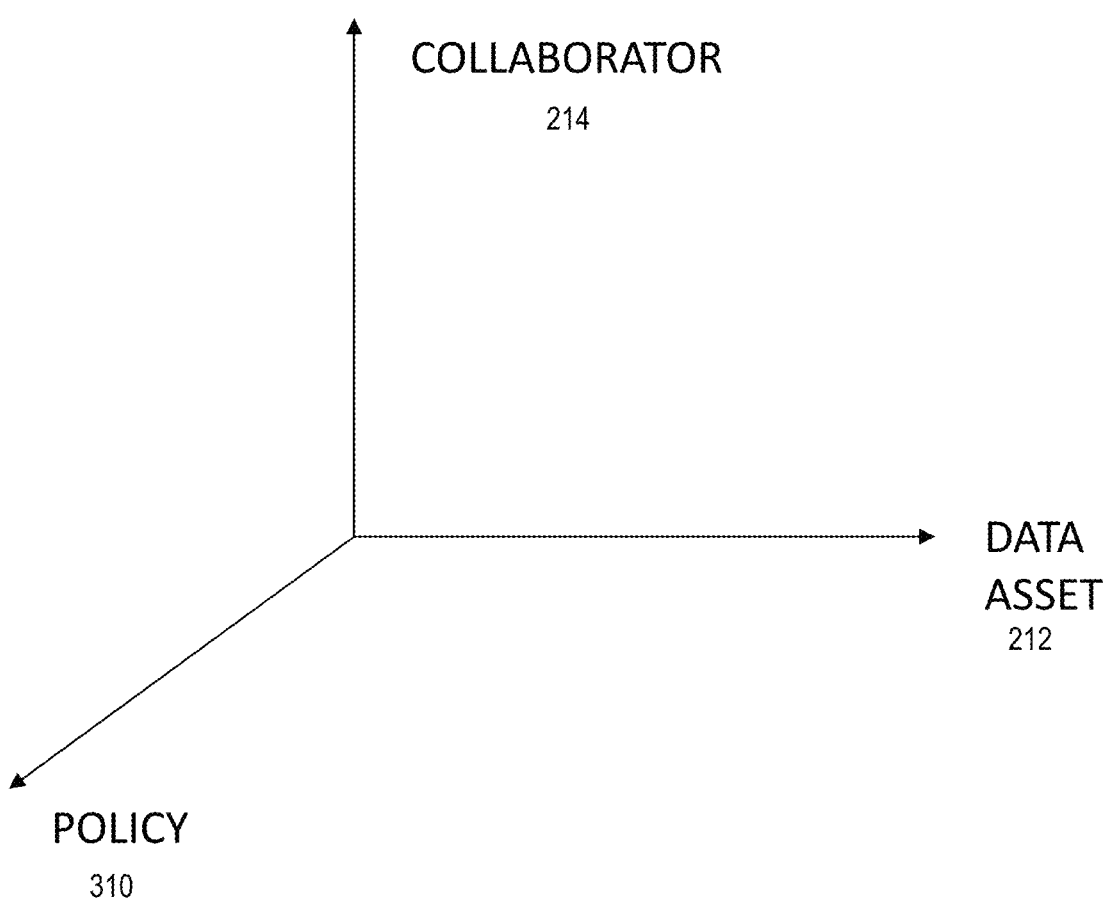
FIG. 3 shows a three-dimensional relationship between a collaborator, a data set and a data protection policy according to aspects of the invention.

FIG. 3 illustrates the three-dimensional relationship which exists, in accordance with aspects of the present invention, between the collaborators 214, the project data assets 212 (which are brought into the project 210 from the cataloged data assets 222 of the curated catalog 220 or from public datasets 230) and data protection enforcement policies 310 which are implemented, in accordance with the present invention, for controlling the degree of access allowed both by project collaborators 214 and new users 240, who are potential project collaborators, with regard to the project data assets 212. As discussed above, conventionally all collaborators 214 on a project have been treated as a single group. This fails to take into consideration individual attributes of each of the collaborators 214. In accordance with the three-dimensional relationship shown in FIG. 3, an aspect of the present invention is enforcing data protection policies 310 to determine the degree of access to the project data assets 212 allowed to project collaborators 214 and, potentially, to outside users 240 if they are accepted to become project collaborators 214.

In accordance with aspects of the present invention, the policies 310 are sets of rules about how data is to be accessed and by whom. More particularly, in accordance with aspects of the present invention, an administrator for the project 210 and/or the project collaborators 214, establish a plurality of rules for evaluating actions performed in the project 210. When an action involving the project 210 is requested (such as inviting a new user 240 to become a project collaborator, or cloning/moving a new data asset from the cataloged data assets 222 into the project data assets 212), the established data protection rules are applied to a plurality of sets of data related to the project data assets 212 to create a plurality of determinations.

As an example, as will be discussed in greater detail with regard to FIG. 5, when the action is adding a new user 240 to the plurality of project collaborators 214, the plurality of sets of data include user/asset pairs. Specifically, the data protection rules are applied to the new user 240 with regard to each of the plurality of project data assets 212. In accordance with aspects of the present invention, this process of applying the data protection rules for each of the project data assets 212 to a new user 240 is performed for each of the project collaborators 214 before they are allowed to become project collaborators 214. In this way, rather than treating all of the project collaborators 214 as a single entity, an individual analysis is made in each case for each one of the project collaborators 214 with regard to each of the project data assets 212 to ensure that the rules of the data protection policies 310 are enforced. In other words, in response to each of the determinations resulting from applying the rules for the requested action to the plurality of sets of data being allowed, the requested action will be performed. However, if any of the determinations resulting from applying the rules to the plurality of sets of data are denied, the requested action will not be performed.

As an alternative to a requested action being approved or denied, in accordance with aspects of the present invention an asset transformation operation is performed to transform one or more of the project data assets 212 to a form which will allow for performing a requested action, which would otherwise be denied when applying the data protection rules of the policies 310 to the project data assets 212 in their current form. This asset transformation operation will be discussed hereinafter in more detail with regard to FIGS. 4-7.

As mentioned above, each policy 310 is effectively a collection of rules established, for example, by an administrator and/or all, or at least a majority, of the project collaborators 214. It is further noted that each policy has data attributes, which are either computed or manually assigned by the administrator, for example, and user contexts (or attributes).

For example, if the administrator determines that a data protection policy is that all collaborators 214 for the project need to have clearance to review data from another country, then any new user 240 requesting an action to be invited to become a collaborator will be subject to this rule, and, if the rule is not satisfied with regard to each of the assets, (i.e., the new user 240 is restricted from data from the other country), the requested action will be denied. Another example of a data protection policy is denying access to all financial data in the project data assets to any new users 240 who have had previous business ties within the last five years with a rival company.

As an alternative example, if the administrator determines that no current collaborators 214 should be allowed access to the project data assets 212 unless a certain new criteria is satisfied, the administrator, in accordance with aspects of the invention, requests an action to set this as a rule change for a data protection policy 310. This proposed rule change will then be applied with regard to each of the current project data assets 212 for each of the current project collaborators 214 to determine which of the collaborators 214 comply with the proposed rule change. If some of the current collaborators 214 do not comply with the rule change, a poll is taken of all of the collaborators 214 to arrive at a decision to either modify the proposed rule change, or disinvite the current collaborators who do not comply with the rule change, or remove any assets that cause the noncompliance. These operations will be discussed in more detail in FIG. 7.

Figure 4:
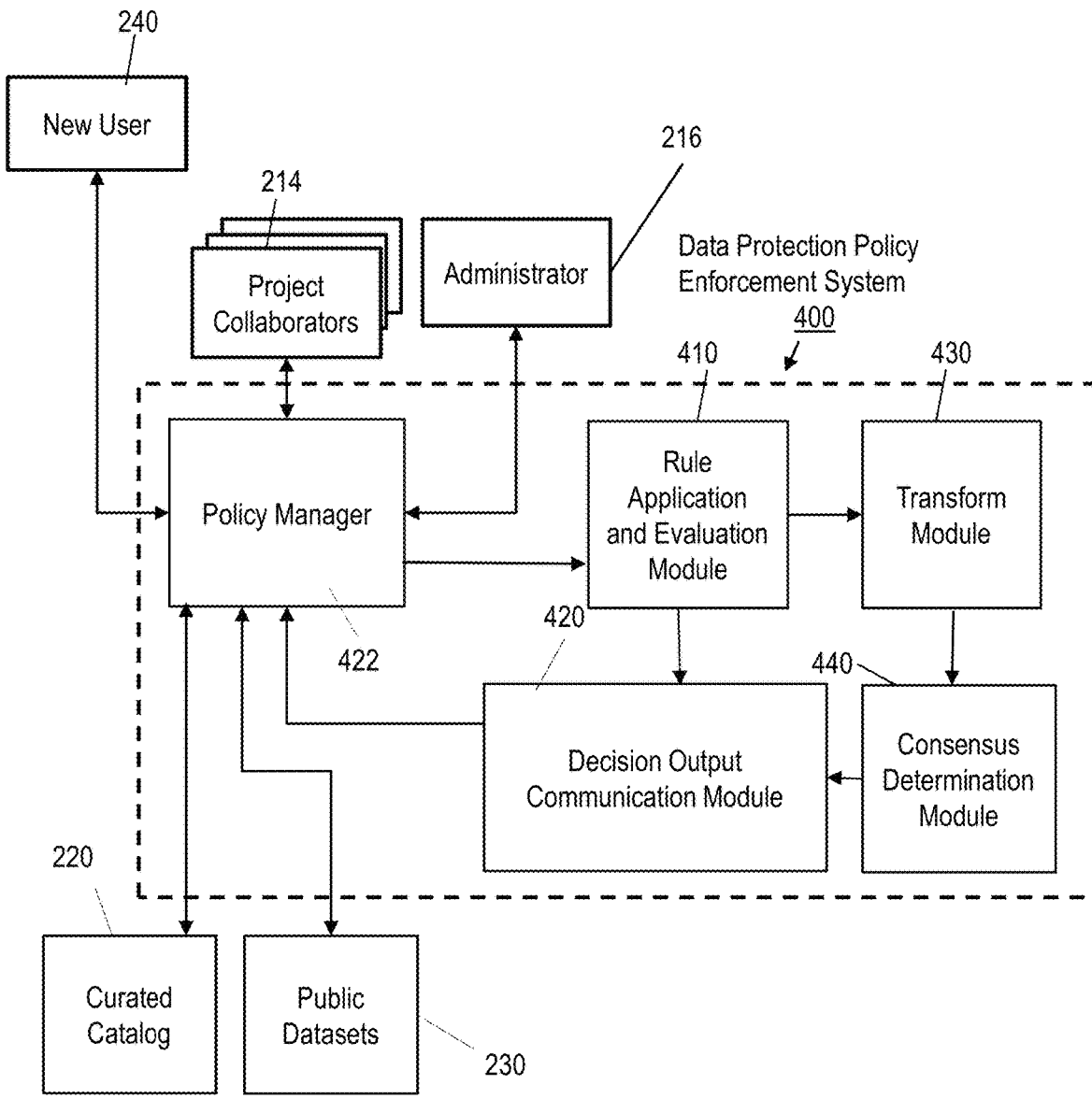
FIG. 4 shows a block diagram of an exemplary embodiment in accordance with aspects of the invention.

FIG. 4 is a block diagram illustrating a data protection policy enforcement system 400 in accordance with aspects of the present invention. It is noted that the data protection policy enforcement system 400 can be implemented by the computer system/server 12 of FIG. 1, and that the modules 410, 420, 422, 430 and 440 of the data protection policy enforcement system 400 shown in FIG. 4 correspond to program modules 42 of FIG. 1.

Referring to FIG. 4, the policy manager 422 receives inputs and provides outputs to the project collaborators 214, the administrator 216, the curated catalog 220, public datasets 230 and new users 240, thereby allowing communication to and from the data protection policy enforcement system 400. Generally, the project collaborators 214 are a subset of users of the organization that have joined a project, and users are either accepted or denied becoming collaborators depending on the project and the data protection policies. In embodiments, the data protection policy enforcement system 400 includes a rule application and evaluation module 410, a decision output communication module 420, a policy manager 422 (which, like modules 410, 420, 430 and 440 is a module 42 such as shown in FIG. 1 and described previously herein), a transform module 430, and a consensus determination module 440. In embodiments, the system may include additional or fewer components than those shown in FIG. 4. In embodiments, separate components may be integrated into a single computing component or module. Additionally, or alternatively, a single component may be implemented as multiple computing components or modules In accordance with aspects of the invention, the rule application and evaluation module 410 receives request for actions provided to the data protection policy enforcement system 400 from project collaborators 214, the administrator 216, new users 240, the curated catalog 220 and public datasets 230, via the policy manager 422. The rule application and evaluation module 410 evaluates the requested actions by applying the data protection policy rules to a plurality of sets of data related to the project data assets 212 to create a plurality of determinations or decisions as to whether the data protection policy rules are satisfied. For example, as discussed above, in accordance with an embodiment of the invention, the plurality of sets of data are user/asset pairs of current project collaborators 214 and/or any new users 240 paired with each of the project data assets 212. The rule application and evaluation module 410 in accordance with aspects of the invention, provides a decision for each one of the user/asset pairs as to whether each user/asset pair satisfies the rule being applied.

Once the rule application and evaluation module 410 makes the plurality of decisions for each of the plurality of sets of data, respectively, the rule application and evaluation module 410 then applies a Deny/Transform/Allow precedence rule to each of the plurality of decisions to provide a determination as to whether the requested action can, for each individual set of data, be allowed, or could be made allowable by transforming an element of the set of data in question (such as transforming features of an asset or of a user/collaborator or a policy), or cannot be allowed, or made allowable by a transformation operation, and, as such, must be denied.

If the rule application and evaluation module 410 determines from the plurality of determinations regarding the plurality of sets of data and the application of the Deny/Transform/Allow rule, that all data protection policy rules are satisfied with regard to the requested action, the rule application and evaluation module 410 provides an output to the decision output communication module 420 that the requested action is approved. In this case, the decision output communication module 420 provides an output to the policy manager 422 that the requested action is approved, which, in turn, provides this approval to the administrator 216 and one or more of the project collaborators 214.

On the other hand, if at least one of the plurality of determinations made by the rule application and evaluation module 410 indicates that the data protection policy rules are not satisfied, the rule application and evaluation module 410 sends an output to the decision output communication module 420 to deny the requested action, unless, as noted above, the rule application and evaluation module 410 determines that a possible transform exists (e.g. modifying a project data asset 212 or a rule) that would render the requested action acceptable. The decision output communication module 420 provides an output to the policy manager 422 denying the requested action unless, as noted, a possible transform exists.

If the rule application and evaluation module 410 determines that a possible transform exists, the rule application and evaluation module 410 outputs the information in question (i.e., the requested action and the determination that it does not comply with current rules) to a transform module 430. The transform module 430 applies a transformation, for example, of one or more project data assets 212, or of a policy rule 310. The transform module 430 then applies the result of this transformation to the consensus determination module 440. The consensus determination module 440 then polls each of the project collaborators 214 to determine whether the proposed transformation is acceptable to each of the project collaborators 214, or at least, based upon prior agreement or policy, a majority or a predetermined percentage of the project collaborators 214. In embodiments, the administrator 216 is regarded as one of the project collaborators, and is included in determining a consensus. In alternative embodiments, the administrator is provided with a more heavily weighted vote regarding consensus than the other project collaborators 214.

In embodiments, when the consensus determination module 440 determines that a consensus has been reached with regard to the proposed transformation, the consensus determination module 440 provides an output to the decision output communication module 420 to provide an output to the policy manager 422 that the requested action is approved, with the approved transformation. On the other hand, when the consensus determination module 440 determines that a consensus has not been reached with regard to the proposed transformation, the consensus determination module 440 provides an output to the decision output communication module 420 to provide an output to the policy manager 422 that the requested action is denied.

Figure 5:
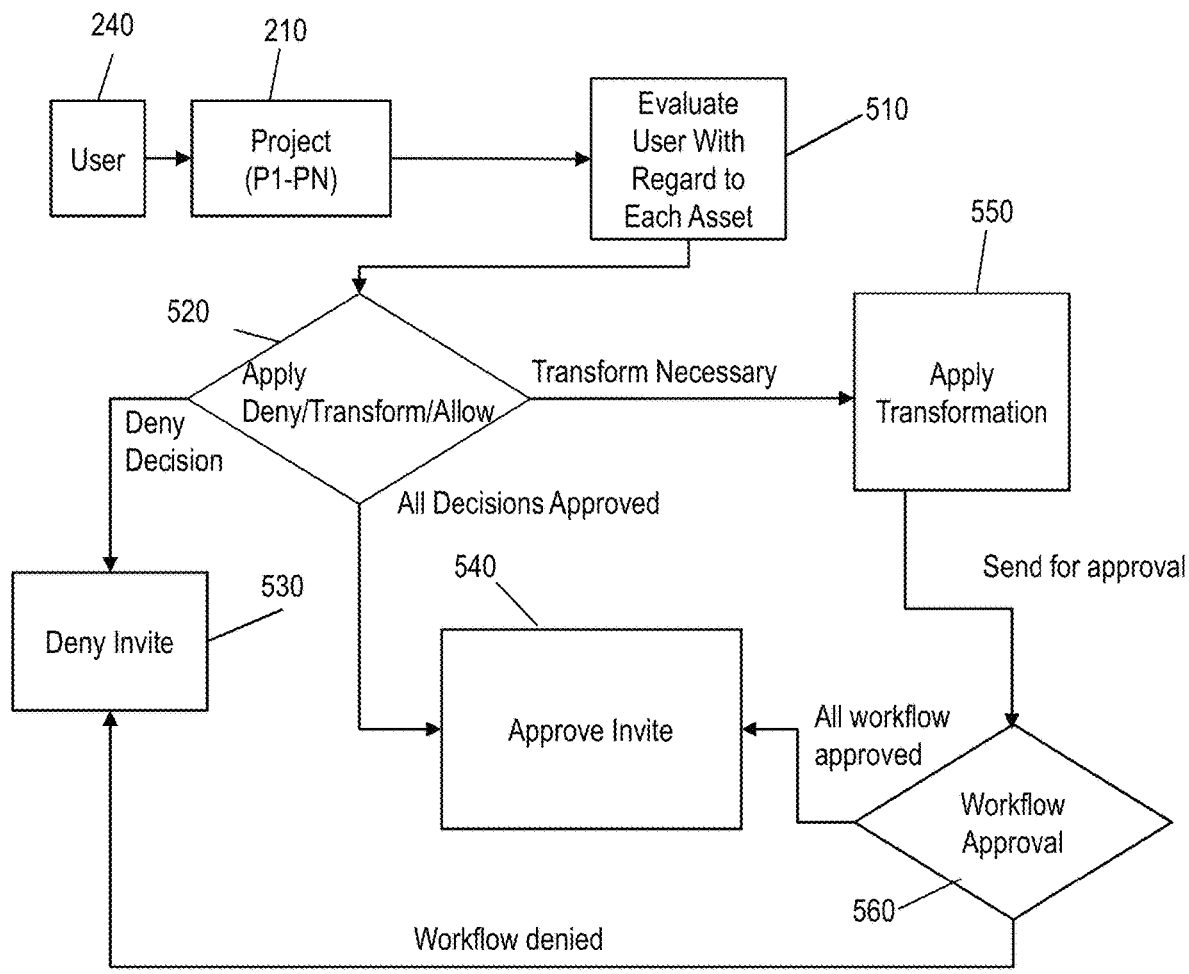
FIG. 5 shows a flowchart of an exemplary embodiment for inviting a user to become a collaborator within a collaborative project in accordance with aspects of the invention.

FIG. 5 shows a flowchart of an exemplary embodiment for inviting a new user 240 to possibly become a collaborator 214 within a collaborative project 210 in accordance with aspects of the invention. The steps of the method of FIG. 5 are performed in the environment of FIG. 4 and are described with reference to the elements and steps described with respect to FIGS. 1-4.

In step 510 the rule application and evaluation module 410 evaluates data regarding the new user 240, requesting to become a project collaborator 214, by applying the data protection rules established by the administrator 216 and/or the project collaborators 214 for each one of the project data assets 212. In other words, this evaluation in step 510 is the application of the data protection rules to a plurality of sets of data which include new user/asset pairs of the new user 240 with each of the plurality of project data assets 212. The results of this evaluation are a plurality of determinations, or decisions, as to whether each of the user/asset pairs is allowed under the current data protection rules set by the data policy 310.

After the evaluation step 510, the rule application and evaluation module 410 applies a Deny/Transfer/Allow precedent rule in step 520 with regard to all of the decisions made in the step 510. If all the decisions in the step 510 are approved decisions, i.e., allowable under the current data protection rules, the Deny/Transform/Allow precedent rule provides an output that all decisions are approved. In this case, the decision output communication module 420 approves, in step 540, the invitation of the user 240 to become a project collaborator 214. If any of the decisions made in step 510 regarding evaluating the new user 240 using the rules with regard to each of the project data assets 212 indicate that acceptance of the new user 240 should be denied with regard to the current project data assets 212, the rule application and evaluation module 410 decides, in step 520, to either provide an output to the decision output communication module 420 to deny inviting the user 240 to become a collaborator 214 (step 530), or to apply a transformation, via the transform module 430, in step 550 to one or more of the project data assets 212 so that the new user can become a project collaborator 214.

Specifically, in step 550, the transform module 430 applies a transformation to one or more of the project data assets 212 to provide a transformed asset that is allowable for the new user 240, and outputs the transformed asset to the consensus determination module 440. In step 560, the consensus determination module 440 polls each of the current project collaborators 214, and/or the administrator 216, to determine if a consensus is reached among the current project collaborators 214 and/or the administrator 216 as to whether the workflow with one or more of the transformed assets is acceptable.

In accordance with embodiments of the present invention, in step 560, the transform module 430 and the consensus determination module 440 only allow applying a transformation to one or more assets 212, via the consensus determination module 440, and/or the administrator 216, if a consensus is reached among all of the current project collaborators 214 to allow this transformation of one or more of the project data assets 212. In embodiments, the consensus determined in step 560 by the consensus determination module 440 requires all of the current project collaborators 214, to agree to the transformation of one or more project data assets 212. In alternative embodiments, the consensus determined in step 560 by the consensus determination module 440 requires at least a majority of the current project collaborators 214, or a required percentage, greater than a majority, to agree to the transformation of the project data assets 212.

In accordance with aspects of the present invention, when a consensus is reached among the current project collaborators 214 to transform an asset to allow a new user 240 to become a project collaborator, the decision output communication module 420 stores, via the policy manager 422, original project data asset 212, prior to the transformation, in the curated catalog 220 or in another part of the memory 28 of FIG. 1. In accordance with other aspects of the present invention, applying the transformation in step 550 takes place by changing what the project collaborators 214 actually see, without changing the actual data regarding the project data assets 212 themselves.

An example of operations in accordance with FIG. 5 is now provided based on the following parameters:

There is a project P.

There is a curated catalog C.

There are assets $A_1, A_2, \ldots A_n$ currently present in project P.

There are collaborators $C_1, C_2, C_3 \ldots C_n$ currently in project P.

There are policies $p_1, p_2, \ldots p_n$ currently in effect.

There is a new user $U_1$ requesting to become a collaborator.

With these parameters, FIG. 5 operates, in the manner described above, to carry out the following operations in response to a request for an action input into the data protection policy enforcement system 402 to invite a new user $U_1$ to become a project collaborator 240:

User $U_1$ being invited, collaborators $C_1, C_n$.

$U_1$ is expected to become $C_{n-1}$ if authorized by policies.

Given that a user instance is being inducted into the project, this user instance will be tested against a data dimension policy $p_{1 \ldots n}$ (aka an asset dimension policy already in the project $A_1, A_2 \ldots A_n$)

For each asset in the project P, evaluate $(p_{1 \ldots n})$ resulting in decisions $(d_1, \ldots d_n)$.

Apply the precedence rule DENY>TRANSFORM>ALLOW with sub-transformer precedence rules, as the case may be, to the decisions $d_1, \ldots d_n$.

If any of the $d_1 \ldots d_n$ is a deny, the invite/induction of the user $U_1$ is denied.

If there is no deny, but there is a transform associated with some asset $A_j$ in the list that is required for the User $U_1$ to be approved, then move to the consensus workflow within Project P.

If consensus is reached, apply consensus transform as to a pending transform to $A_j$ in-place and proceed to approve invite.

If there is none of the above, then the invite is successful.

Figure 6:
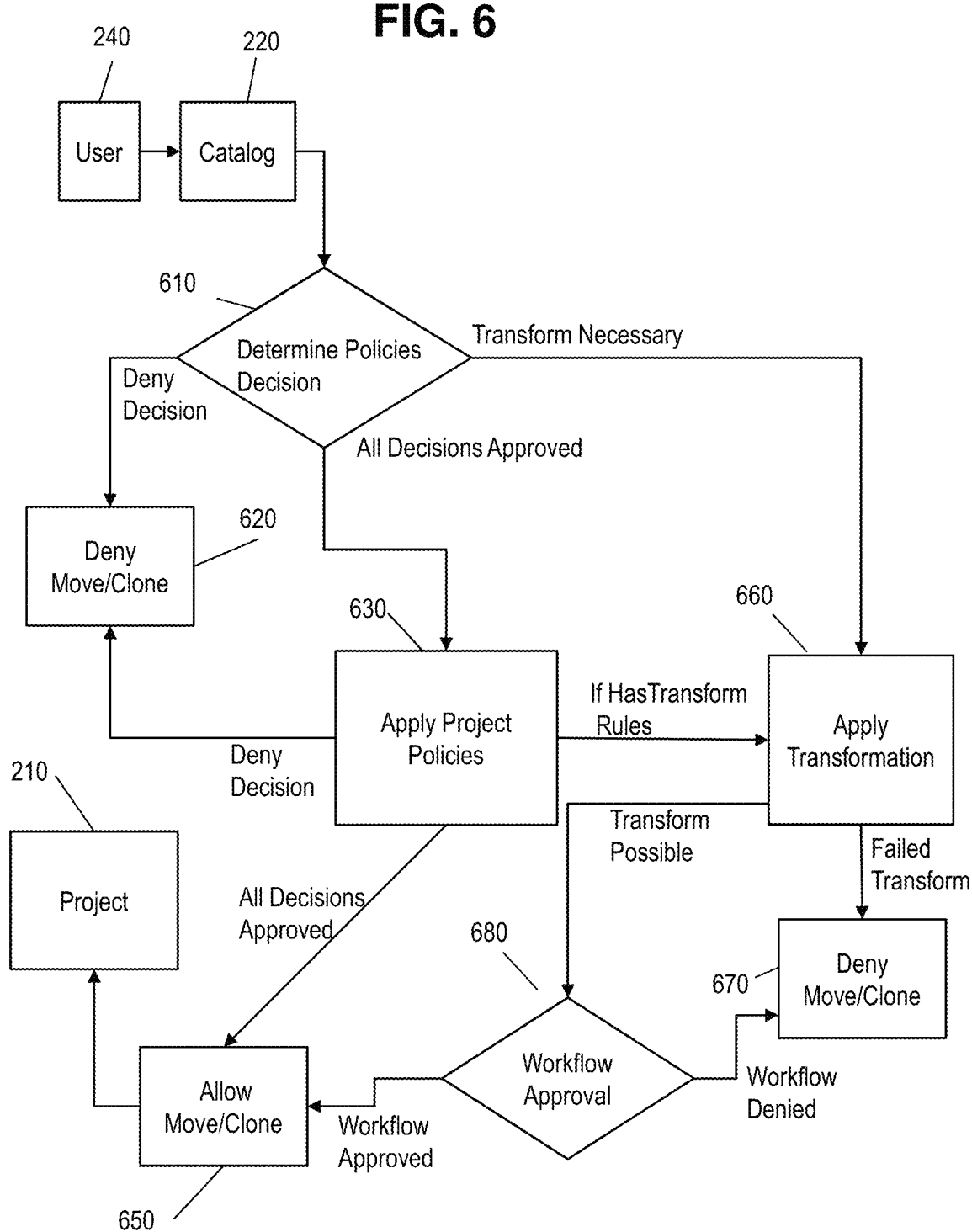
FIG. 6 shows a flowchart of an exemplary embodiment for cloning/moving data from a curated catalog to a collaborative project in accordance with aspects of the invention.

FIG. 6 shows a flowchart of an exemplary embodiment for cloning/moving a new asset from the curated catalog 220 to the collaborative project 210, in accordance with aspects of the invention. The steps of the method of FIG. 6 are performed in the environment of FIG. 4 and are described with reference to the elements and steps described with respect to FIGS. 1-4. The asset being proposed for cloning/moving will be either allowed, denied or transformed depending on the organization policies and project collaborators. Potential exceptions can be handled by the workflow.

At step 610, the rule application and evaluation module 410 receives a request for cloning/moving a new asset, such as cataloged dataset 222, from the curated catalog 220 into the project 210 at the request of a user 240. In embodiments, the user 240 is generally one of the current project collaborators 214, although, in alternative embodiments, the user 240 is an outside user. Once the request is received, in step 610, the rule application and evaluation module 410 determines policy disposition of the requesting user vis-à-vis the particular new asset in question to determine whether the requesting user has the authorization to request the clone/move of the new asset from the curated catalog 220 into the project 210 under current data protection policy rules. The rule application and evaluation module 410 makes the policy decision with regard to the requested action utilizing the Deny/Transform/Allow rule for the data set comprised of the requesting user and the new asset for which the clone/move request is being made.

If this policy disposition in step 610 determines that the requesting user does not have the authorization to clone/move the new asset from the curated catalog 220 into the project 210, in step 620 the rule application and evaluation module 410 provides an output to the decision output communication module 420 to provide an output to the policy manager 422 that the requested action is denied.

On the other hand, if the policy disposition in step 610 determines that the requesting user does have the authorization to call/move the new asset from the curated catalog 220 into the project 210, the rule application and evaluation module 410 proceeds to a next step 630 of applying local project policies of the project 210 to the proposed new asset with regard to each of the current project collaborators 214 (i.e., in this case the plurality of data assets comprise the proposed new asset paired, individually, with each of the current project collaborators 214) to arrive at a plurality of decisions regarding the application of the local policies of the project to the plurality of data assets based on the proposed new asset being added to the project data assets 212.

As shown in FIG. 6, another possibility in step 610 is that the rule application and evaluation module 410, in applying the Deny/Transform/Allow rule determines that the new asset from the curated catalog 220 can be added to the project data assets 212, provided a transformation is made, for example with regard to characteristics of the proposed new data asset. In this case, the rule application and evaluation module 410 provides the proposed new asset to the transform module 430 to apply the transformation to render the proposed new asset acceptable, as shown in step 660.

In step 630, the rule application and evaluation module 410 applies the local project policy rules to a plurality of sets of data, each set being comprised of the newly proposed data asset to be cloned/moved from the curated catalog 220 to the project 210 and a respective one of the current project collaborators 214. This operation results in a plurality of decisions as to whether the respective sets of data each satisfy the local project policies. In step 630, the rule application and evaluation module 410 applies the Deny/Transform/Allow rule to each of the plurality of decisions, and provides an output that either all of the decisions are approved under the local project policy rules, or could be approved if a transform is applied to the proposed new data asset, or must be denied.

As shown in FIG. 6, if the rule application and evaluation module 410 determines, in step 630, that all of the decisions can be approved, the rule application and evaluation module 410 provides an output to the decision output communication module 420 to provide an output that the proposed move/clone operation of the new data from the catalog 220 to the project 210 is approved, as shown in step 650. If one or more of the plurality of decisions with regard to the plurality of sets of data is not approved, and cannot be transformed to obtain approval, the rule application and evaluation module 410 sends an output to the decision output communication module 420 to deny the move/clone, as shown in step 640. Alternatively, if the Deny/Transform/Allow rule indicates that a transformation can be made to the proposed new data to make it allowable, the rule application and evaluation module 410 applies the transformation in step 660, utilizing the transform module 430. The rule application and evaluation module 410 then outputs an indication that transformation rules exist in step 630.

Next, as shown in FIG. 6, in step 680, the consensus determination module 440 polls each of the current project collaborators 214, and/or the administrator 216, to determine if a consensus is reached among the current project collaborators 214 and/or the administrator 216 as to whether the workflow with one or more of the transformed assets is acceptable. If step 680 determines that consensus does not exist among the project collaborators 214 and/or the administrator 216, the consensus determination module 440 instructs the decision output communication module 420 in step 670 to deny to the requested action for cloning/moving the new asset into the project 210. On the other hand, if all necessary transformations are approved in step 680, the consensus determination module 440 instructs the decision output communication module 420 to allow the move/clone action, as shown in step 650.

Based upon the above discussion with regard to FIG. 6, and applying the parameters noted above with regard to FIG. 5, the operation of FIG. 6 is set forth below for carrying out the following operations in response to an action input into the data protection policy enforcement system 400 to clone/move a new data asset 222 from the curated catalog 220 into the project 210 to become a project data asset 212:

Attempt to clone asset $A_j$ from the curated catalog C by user $U_j$.

Determine policy disposition of $U_j$ and $A_j$ in general with regard to C.

If $U_j$ is denied, then the clone/move is a failure.

Set accumulated set $T_c$ to NULL—i.e., $T_c$ is a collection of applicable transforms to the new asset $A_j$.

If $U_j$'s disposition over $A_j$ results in a transform $T_j$, save $T_j$ to memory.

Append $T_j$ to $T_c$.

Determine if project P has local policies relative to proposed new asset $A_j$. This results in 0 or more additional transforms $T_L$, which are also saved to memory.

Append $T_L$ to $T_c$.

Determine the disposition for new asset $A_j$ for each of the collaborators $C_1, C_2 \ldots C_n$ currently registered to P, excluding the requester $C_j$ if $C_j$ is already a collaborator or not (case is $C_j \in \{C_1, C_2, \ldots C_n\}$ or not).

Each of the dispositions can be a deny or a transform.

If there is a single deny in {t}, it is a clone/move failure. If not, proceed.

Find the union $U_{i=1 \ldots k}(t_i)$ of $t_1, t_2 \ldots t_n$ (noting that this is a special operator, not a standard union)

Append $U_{i=1 \ldots k}(ti)$ to the accumulated set $T_c$.

Optimize $T_c$ for time/space/order resulting in $T_{maximal}$.

Apply transform $T_{maximal}$ to new asset in the cloning operation to project P. Standard assumptions of embodiments of clone/move operation apply.

Figure 7:
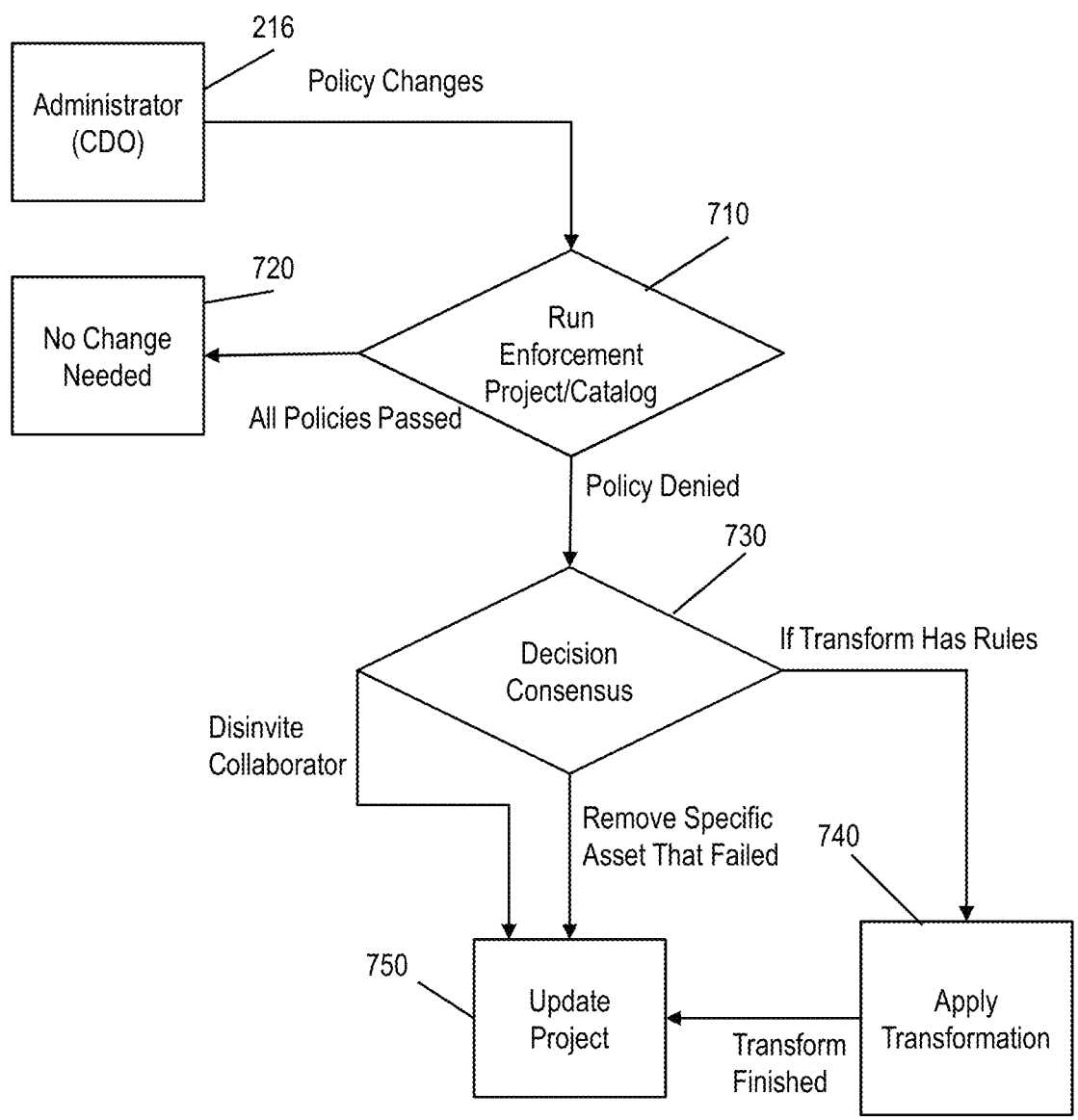
FIG. 7 shows a flow chart of an exemplary embodiment for changing a data enforcement policy in a collaborative project in accordance with aspects of the invention.

FIG. 7 shows a flowchart of an exemplary embodiment for changing a data enforcement policy in a collaborative project, in accordance with aspects of the invention. As discussed earlier, in accordance with aspects of the invention, the administrator 216, for example, can request a change in the data protection policy rules for a variety of reasons, including updating the rules to reflect business or technical changes. The steps of the method of FIG. 7 are performed in the environment of FIG. 4 and are described with reference to the elements and steps described with respect to FIGS. 1-4.

At step 710, the rule application and evaluation module 410 runs enforcement operations with regard to a proposed new rule change relative to each of the current project collaborators 214. In embodiments, the rule application and evaluation module 410 also performs the step 710 to run enforcement of the proposed new rule change relative to new users 240 requesting to become project collaborators. At step 710, the rule application and evaluation module 410 performs running enforcement of the proposed new rule (implementing the proposed change) for a plurality of pairs respectively comprised of the current project collaborators (and, if desired, new users applying to become collaborators) and the current project data assets 212. As discussed above with regard to steps 510, 520, 610 and 630 of FIGS. 5 and 6, the rule application and evaluation module 410 performs step 710 with regard to the proposed new rule applied to each of the user/asset pairs by first making a plurality of decisions, respectively, regarding the application of the proposed new rule to each of the individual user/asset pairs. Then, also in step 710, the rule application and evaluation module 410 applies the Deny/Transform/Allow rule to this plurality of decisions to determine whether all of the user/asset pairs are allowable under the proposed new rule, or whether a transformation can be made to render them all allowable, or whether one or more of the user/asset pairs must be denied.

Specifically, if the result of step 710 is a determination that all proposed new policies permit allowing all of the current user/asset pairs, the rule application and evaluation module 410 provides an output to the decision output communication module 420 to approve the policy change, as shown in step 720. On the other hand, if the result of step 710 is a determination that not all of the current user/asset pairs are allowable under the proposed new policy changes, the rule application and evaluation module 410 proceeds to step 730 to determine if a consensus exists for the policy change. At step 730, the consensus determination module 440 polls all of the current project collaborators 214 (and/or the administrator 216) to determine if a consensus exists for the policy change, notwithstanding the fact that not all of the current user/asset pairs are permissible under the policy change. At step 730, if a consensus is arrived at among at least a predetermined plurality of the current project collaborators 214 (and/or the administrator 216), the consensus determination module 440 advises the decision output communication module 420 to perform one of the three possible actions of: disinviting one or more current collaborators 214 who do not comply with the proposed policy change (followed by approving the policy change in step 720); removing a specific asset among the project data assets 212 which caused one or more of the user/asset pairs to fail under the proposed policy change (followed by approving the policy change in step 750); or applying an appropriate transformation to appropriate project data assets (which caused one or more of the user/asset pairs to fail under the proposed policy change) to modify the project data assets in question to allow all of the user/asset pairs to comply with the policy change (followed by approving the policy change in step 750).

Based upon the above discussion with regard to FIG. 7, and applying the parameters noted above with regard to FIG. 5, the operation of FIG. 7 is set forth below for carrying out the following operations in response to an action input into the data protection policy enforcement system 400 to clone/move a new data asset 222 from the curated catalog 220 into the project 210 to become a project data asset 212:

Compute the Cartesian Product of the $\{C_i\}$ X $\{A_j\}$, where the sets represent the set of current collaborators and current assets including derived assets of A. Produce a set of 2-tuples $\{c_i, a_j\}$.

Run enforcement decisions over the generated 2-tuple set. This leads to sets of decisions If all decisions $d_i$ . . . are ALLOW, the policy change action is complete.

If any decision $d_i$ . . . is a DENY, then branch to consensus workflow for each instance of a DENY associated with a $\{c_i, a_j\}$ pair. The consensus workflow will result in a decision that can be one of the following: disinvite specific collaborator in a $\{c_i, a_j\}$ pair; remove specific asset and its derivatives from the project P; and transform one or more specific assets and their derivatives in the project P.

If any decision $d_i$ . . . is a TRANSFORM, then collect in $T_c$ all transforms for each instance of a transform associated with the $\{c_i, a_j\}$ pair.

Optimize $T_c$ for space/time/order resulting in $T_{maximal}$.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    establishing, by a computer device, a plurality of rules for evaluating actions performed in a collaborative environment, the collaborative environment including a plurality of collaborators and a plurality of data assets associated with collaboration between the collaborators;
    in response to a request to perform an action in the collaborative environment, applying, by the computer device, the rules to the plurality of data assets to create a plurality of determinations;
    in response to a change in the rules, disinviting, by the computer device, a collaborator of the collaborators not complying with the change in the rules;
    in response to each of the plurality of determinations being allowed, allowing, by the computer device, the action to be performed; and
    in response to at least one of the plurality of determinations being denied, preventing, by the computer device, the action from being performed.

2. The method of claim 1, wherein the action is adding a new user to the plurality of collaborators, and the rules are applied to a plurality of user/asset pairs of the new user with each of the plurality of data assets.

3. The method of claim 2, further comprising, in response to determining that, when applying the rules to one of the user/asset pairs results in a determination that one of the user/asset pairs is not allowable under the rules, but would be allowable if the data asset was transformed to a form that is allowable for the new user to access, providing a determination that the data asset needs to be transformed before the new user can be added to the plurality of collaborators.

4. The method of claim 3, further comprising:
in response to the determination being that the one of the data assets needs to be transformed to a form that is allowable for the new user, initiating, by the computer device, a consensus request from the plurality of collaborators to determine if the transform of the one of the data assets is acceptable to each of the collaborators;
in response to a consensus being reached, transforming, by the computer device, the data asset and adding the new user to the plurality of collaborators; and
in response to a consensus not being reached, preventing, by the computer device, the new user from being added to the plurality of collaborators.

5. The method of claim 1, wherein the rules comprise multi-dimensional policy evaluation rules configured for data protection in the collaborative environment.

6. The method of claim 1, wherein the action is adding a new data asset, from a catalog of project data assets, to the plurality of data assets at the request of one of the plurality of collaborators, and the plurality of sets of data include user/asset pairs for each of the collaborators with the new data asset.

7. The method of claim 6, further comprising, in response to determining that, when applying the rules to one of the user/asset pairs results in a determination that one of the user/asset pairs is not allowable for the new data asset, but would be allowable if the new data asset was transformed to a form that is allowable for each of the collaborators, providing a determination that the new data asset needs to be transformed before the new data asset can be added to the plurality of data assets within the collaborative environment.

8. The method of claim 7, further comprising:
in response to the determination being that the new data asset needs to be transformed to a form that is allowable for each of the collaborators, initiating, by the computer device, a consensus request from the plurality of collaborators to determine if the transform of the new data asset is acceptable to each of the collaborators;
in response to a consensus being reached, subsequently applying a cumulative transforming action on the data asset as specified in qualifying rules into a new data asset, by the computer device, the new data asset and adding the new data asset to the plurality of data assets; and
in response to a consensus not being reached, preventing, by the computer device, the new data asset from being added to the plurality of data asset.

9. The method of claim 1, wherein the action is to perform at least one selected from the group consisting of: adding a new rule; and changing an existing rule to make a new rule, and wherein the plurality of sets of data include user/asset pairs of each of the plurality of collaborators with the new rule.

10. A system comprising:
a processor, a computer readable memory, and a computer readable storage medium located in a computer device;
program instructions to establish a plurality of rules for evaluating actions performed in a collaborative environment, the collaborative environment including a plurality of collaborators and a plurality of data assets associated with collaboration between the collaborators;
program instructions to, in response to a request to perform an action in the collaborative environment, apply the rules to the plurality of sets of data assets to create a plurality of determinations;
program instructions to, in response to each of the plurality of determinations being allowed, allow the action to be performed;
program instructions to, in response to a change in the rules, disinvite a collaborator of the collaborators not complying with the change in the rules;
program instructions to, in response to determining that one of the data assets is not allowable under the rules, but would be allowable if a portion of the one of the data assets was transformed to a form that is allowable, provide a determination that the portion of the one of the data assets needs to be transformed before the action is allowed, wherein a transformation to transform the portion of the one of the data assets includes changing what the collaborators see without changing data of the one of the data assets; and
program instructions to, in response to at least one of the plurality of determinations being denied, prevent the action from being performed,
wherein the program instructions are stored on the computer readable storage medium for execution by the processor via the computer readable memory.

11. The system of claim 10, wherein the action is adding a new user to the plurality of collaborators, and the rules are applied to a plurality of user/asset pairs of the new user with each of the plurality of data assets.

12. The system of claim 11, further comprising, program instructions to, in response to determining that, when applying the rules to one of the user/asset pairs results in a determination that one of the user/asset pairs is not allowable under the rules, but would be allowable if the data asset was transformed to a form that is allowable for the new user to access, providing a determination that the data asset needs to be transformed before the new user can be added to the plurality of collaborators.

13. The system of claim 12, further comprising:
program instructions to, in response to the determination being that the one of the data assets needs to be transformed to a form that is allowable for the new user, initiating, by the computer device, a consensus request from the plurality of collaborators to determine if the transform of the one of the data assets is acceptable to each of the collaborators;
program instructions to, in response to a consensus being reached, transforming, by the computer device, the data asset and adding the new user to the plurality of collaborators; and
program instructions to, in response to a consensus not being reached, preventing, by the computer device, the new user from being added to the plurality of collaborators.

14. The system of claim 10, wherein the rules comprise multi-dimensional policy evaluation rules configured for data protection in the collaborative environment.

15. The system of claim 10, wherein the action is adding a new data asset, from a catalog of project data assets, to the plurality of data assets at the request of one of the plurality of collaborators, and the plurality of sets of data include user/asset pairs for each of the collaborators with the new data asset.

16. The system of claim 15, further comprising, program instructions to, in response to determining that, when applying the rules to one of the user/asset pairs results in a determination that one of the user/asset pairs is not allowable for the new data asset, but would be allowable if the new data asset was transformed to a form that is allowable for each of the collaborators, provide a determination that the new data asset needs to be transformed before the new data asset can be added to the plurality of data assets.

17. The system of claim 16, further comprising:
program instructions to, in response to the determination being that the new data asset needs to be transformed to a form that is allowable for each of the collaborators, initiating, by the computer device, a consensus request from the plurality of collaborators to determine if the transform of the new data asset is acceptable to each of the collaborators;
program instructions to, in response to a consensus being reached, transforming, by the computer device, the new data asset and adding the new data asset to the plurality of data assets; and
program instructions to, in response to a consensus not being reached, preventing, by the computer device, the new data asset from being added to the plurality of data asset, wherein the catalog of project data assets includes project data assets cloned from a curated catalog and placed into a project area which enforces current data protection policies, and the curated catalog is a universal collection of data available to an organization which is carrying out a project.

18. A computer program product, the computer program product comprising a computer readable storage medium having program instructions embodied therewith, the program instructions executable by a computer device to cause the computer device to:
establish a plurality of rules for evaluating actions performed in a collaborative environment, the collaborative environment including a plurality of collaborators and a plurality of data assets associated with collaboration between the collaborators;
in response to a request to perform an action in the collaborative environment, apply, by the computer device, the rules to the plurality of data assets to create a plurality of determinations;
in response to a change in the rules, disinvite, by the computer device, a collaborator of the collaborators not complying with the change in the rules;
in response to the change in the rules, transform, by the computer device, a data asset to a form that is allowable for each of the collaborators by changing what the project collaborators see without changing data of the data asset;
in response to each of the plurality of determinations being allowed, allow, by the computer device, the action to be performed; and
in response to at least one of the plurality of determinations being denied, prevent, by the computer device, the action from being performed.

19. The computer program product of claim 18, wherein the action is adding a new user to the plurality of collaborators, and the rules are applied to a plurality of user/asset pairs of the new user with each of the plurality of data assets.

20. The computer program product of claim 18, wherein the action is to perform at least one selected from the group consisting of: adding a new rule; and changing an existing rule to make a new rule, and wherein the rules are applied to a plurality of user/asset pairs of each of the plurality of collaborators with the new rule.

* * * * *